Figure 1:
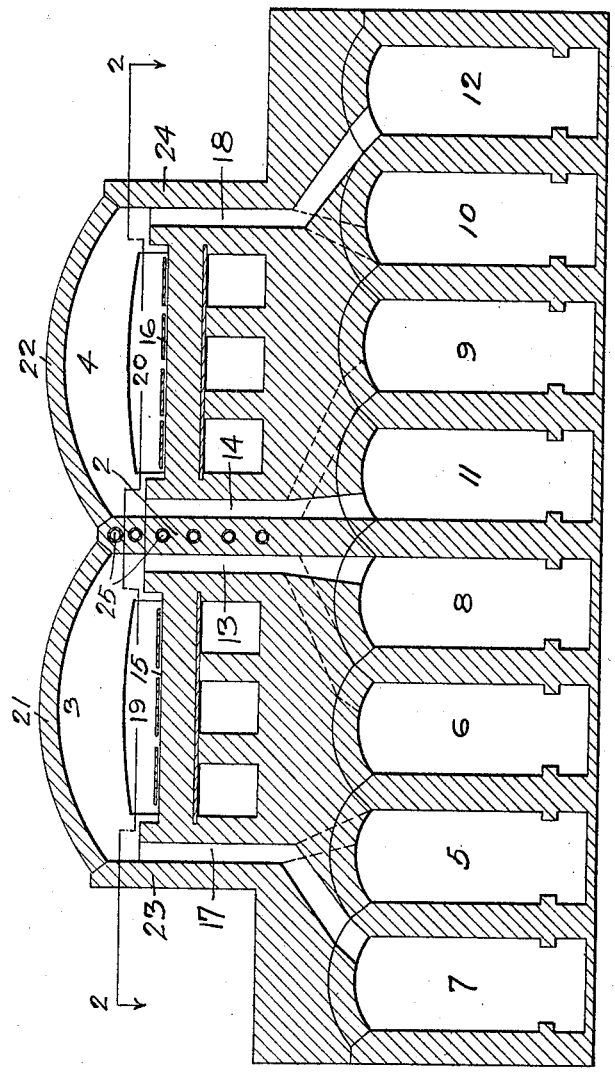

P. PATTERSON.
REGENERATIVE FURNACE.
APPLICATION FILED SEPT. 15, 1911.

1,038,640.

Patented Sept. 17, 1912.

2 SHEETS—SHEET 1.

WITNESSES.

INVENTOR.

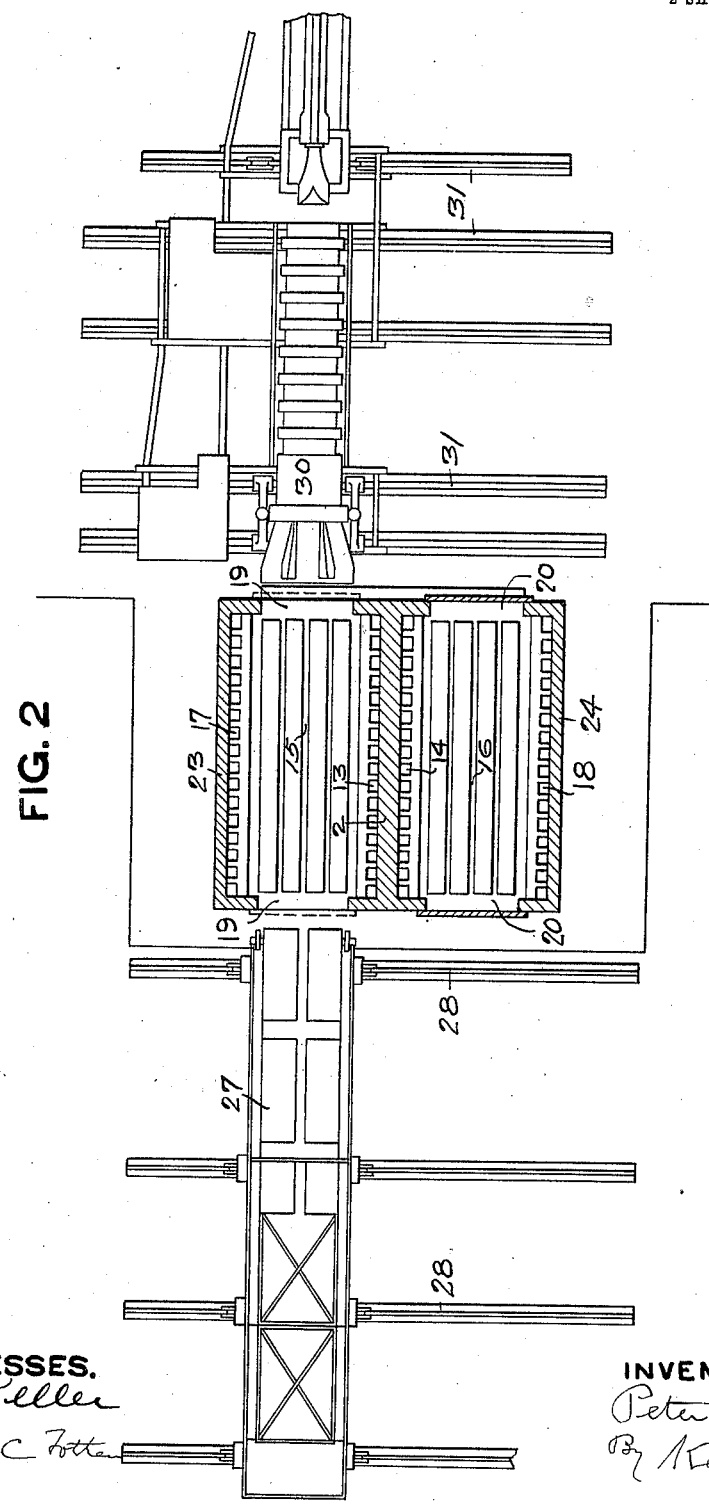

UNITED STATES PATENT OFFICE.

PETER PATTERSON, OF PITTSBURGH, PENNSYLVANIA.

REGENERATIVE FURNACE.

1,038,640.   Specification of Letters Patent.   Patented Sept. 17, 1912.

Application filed September 15, 1911. Serial No. 649,463.

*To all whom it may concern:*

Be it known that I, PETER PATTERSON, a citizen of the United States, and resident of Pittsburgh, in the county of Allegheny and State of Pennsylvania, have invented a new and useful Improvement in Regenerative Furnaces; and I do hereby declare the following to be a full, clear, and exact description thereof.

My invention relates to regenerative furnaces, and primarily though not exclusively, to such furnaces employed for the heating of plates to be bent into skelp for the manufacture of tubing.

In the steadily increasing production of tube welding furnaces it has been found very difficult to maintain a sufficient supply of skelp for a welding furnace, from a single skelp heating as a furnace is now operated. To this end the furnace chambers of the skelp heating furnaces have been increased in width, these furnaces generally having hearths wide enough to receive about 6 plates. It is found difficult with such furnaces to maintain the proper heat, first, because of the difficulty of carrying the heat and flame across so wide a hearth, and second, because the opening of the large furnace doors permits the entrance of large volumes of cold air and prevents the generation of the necessary high heat within the furnace. It is found in operation that not only do the plates heat too slowly and unevenly, but the amount of heat passing out into the regenerators is not sufficient to properly reheat the checker work therein, and upon reversal of the furnace the gas and air are not raised to the desired high heat for perfect combustion.

The object of the present invention is to provide a regenerative furnace system by which a sufficient number of plates may be heated to supply the welding furnace without material change in the charging and skelp forming apparatus or the occupation of much more space in the plant and in which a more perfect heating of the plates may be obtained.

It comprises, generally stated, twin regenerative furnaces having a central partition wall, furnace chambers on each side of that wall, regenerators located under the twin furnaces and regenerator flues rising therefrom on each side of the central wall and at the outer sides of the furnace chamber, so that while a wider space for the heating of the plates is provided and a greater number of plates can therefore be heated, the distance of the travel of the heat and flame is reduced, and one furnace may be closed for the heating of the plates while the plates are drawn from the other furnace, and the twin furnaces occupy so little space that single charging and skelp forming apparatus may be used with the twin furnaces.

In the accompanying drawings Figure 1 is a vertical cross section of a twin furnace embodying my invention; Fig. 2 is a horizontal section of the furnace on the line 2—2 Fig. 1, showing also the position of the charging and skelp making apparatus with relation to the twin furnace.

The twin furnaces embodying my invention have the central vertical wall 2, the furnace chambers 3, 4, at the sides thereof, the gas regenerator 5, 6, and air regenerators 7, 8, of the furnace 3, and the gas regenerators 9, 10, and air regenerators 11 and 12 of the furnace 4. On each side of the central partition wall 2 are the flues 13, 14, rising up into the furnace chambers between the division wall and the hearths 15, 16, the regeneration flues 17, 18, leading from the air regenerators 7 and 12. The location of the flues leading from the gas regenerators is indicated by dotted lines. The furnace chambers are provided with the doors 19 and 20, and with suitable apparatus (not shown) for raising and lowering the same. As so constructed the two furnaces are brought close to each other, being separated by only one division wall and the only increase in width of the twin furnaces according to the width and number of plates heated, over the old single furnaces, is in the space between the hearths of the two furnaces, a very compact twin regenerative furnace construction being thus produced. The central wall 2 forms the support for the roof 21 and 22 of the twin furnaces, the other ends of the roofs being supported by the side walls 23, 24. In order to cool the central division wall of the twin furnaces I employ suitable cooling means within the wall, for example, the water pipes 25 extending longitudinally through the same, this preventing the burning out of the wall which is subjected to heat on both sides thereof through the flame and heat generated in both furnaces, and the heated products passing downwardly through the inner sets of flues of both furnaces.

As illustrated in Fig. 2, on one side of the twin furnace is the plate charging machine 27 which travels laterally on the tracks 28 while on the other side thereof is shown the skelp-forming apparatus, for example, the scarfing and bending machine 30 traveling laterally across the two furnaces on the tracks 31.

In the use of the furnace the plate charging apparatus travels laterally across in front of the twin furnaces and the plates are pushed onto the hearth of either furnace as in the ordinary operation of making skelp. The plates can also be fed from either furnace to the skelp-forming mechanism in the same way as in the usual practice. A great improvement in the heating of these plates is obtained for the following reasons. While the plates are being withdrawn from one furnace and the doors of that furnace are necessarily opened for that purpose, the doors may be kept closed in the other furnace so that a much higher heat can be developed therein and the plates be raised to a higher and more uniform heat for bending without cooling by the admission of the large volumes of air which necessarily enter and are drawn in by the draft of the stack when the doors are opened to feed or discharge plates. As one furnace can thus have its doors closed for a good portion of the heating period, a twin furnace does away with the very serious objection to bending furnaces now in use. In the heating of the furnaces and the plates therein as the width of each furnace chamber of the twin furnace is materially reduced over the width of the single plate heating furnace as now employed, it is evident that the heat and flame are not required to travel so far across the furnace hearth and a higher and more uniform heat can therefore be produced in each of the twin furnaces, and the necessity of operating under a strong or forced draft is overcome, this leading to a more perfect combustion of the fuel, and the maintenance of a much higher heat in each furnace chamber, while the products of combustion passing from the furnace through the flues into the regenerators are at a much higher heat and serve to heat the checker work in the generators to a higher heat, so that upon reversal of the furnace the gas and air passing through the regenerators and into the furnace chamber are at a higher heat and more perfect combustion is obtained. The combined width of hearths in the twin furnace can also be made considerably wider than any possible width of hearth in a single furnace so that a larger number of plates may be heated and a larger supply of skelp for the welding furnaces be thus provided. The expense of operation is not increased as a single charging and skelp forming machine may be employed with the twin furnace, and little or no increase of fuel is required for their operation relative to the number of plates heated.

What I claim is:

Twin regenerative furnaces having a central partition wall, furnace chambers on each side thereof, regenerators located under the twin furnaces and regenerator flues rising therefrom on each side of said central wall and at the outer sides of the furnace chambers.

In testimony whereof, I the said PETER PATTERSON have hereunto set my hand.

PETER PATTERSON.

Witnesses:
ROBERT C. TOTTEN,
JOHN F. WILL.

Copies of this patent may be obtained for five cents each, by addressing the "Commissioner of Patents, Washington, D. C."